(12) United States Patent
Haroun et al.

(10) Patent No.: US 9,694,342 B2
(45) Date of Patent: Jul. 4, 2017

(54) EXCHANGE COLUMN CONTACTOR CONSISTING OF AN ARRANGEMENT OF STRUCTURED PACKINGS

(71) Applicant: IFP Energies nouvelles, Rueil-Malmaison (FR)

(72) Inventors: Yacine Haroun, Davis, CA (US); Pascal Alix, Roussillon (FR); Manel Fourati, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 79 days.

(21) Appl. No.: 14/640,363

(22) Filed: Mar. 6, 2015

(65) Prior Publication Data
US 2015/0251155 A1    Sep. 10, 2015

(30) Foreign Application Priority Data
Mar. 10, 2014   (FR) ..................... 14 51926

(51) Int. Cl.
*B01F 3/04*     (2006.01)
*B01J 19/32*    (2006.01)
*F25J 3/04*     (2006.01)

(52) U.S. Cl.
CPC ......... *B01J 19/32* (2013.01); *F25J 3/04909* (2013.01); *F25J 3/04921* (2013.01); *B01J 2219/3221* (2013.01); *B01J 2219/32213* (2013.01); *B01J 2219/32227* (2013.01); *B01J 2219/32262* (2013.01); *B01J 2219/32265* (2013.01); *B01J 2219/32268* (2013.01); *B01J 2219/32272* (2013.01); *B01J 2219/32286* (2013.01)

(58) Field of Classification Search
CPC ............ B01D 53/18; B01D 3/26; B63B 35/44
USPC ........................................... 261/94
See application file for complete search history.

(56) References Cited

U.S. PATENT DOCUMENTS

| | | | |
|---|---|---|---|
| 3,679,537 A | 7/1972 | Huer et al. | |
| 4,296,050 A | 10/1981 | Meier | |
| 5,486,318 A | 1/1996 | McKeigue et al. | |
| 5,984,282 A | 11/1999 | Armstrong et al. | |
| 7,559,539 B2 | 7/2009 | Zich et al. | |
| 7,559,540 B2 | 7/2009 | Zich et al. | |
| 2002/0195727 A1* | 12/2002 | Sunder | B01J 19/32 261/94 |
| 2006/0244159 A1* | 11/2006 | White | B01J 19/32 261/94 |
| 2007/0036957 A1* | 2/2007 | Zich | B01J 19/32 428/218 |

(Continued)

FOREIGN PATENT DOCUMENTS

FR        2 913 353 A1     12/2008

OTHER PUBLICATIONS

Written Opinion of FR 1451926 dated Mar. 10, 2014.

*Primary Examiner* — Duane Smith
*Assistant Examiner* — Adam W Bergfelder
(74) *Attorney, Agent, or Firm* — Fitch, Even, Tabin & Flannery, LLP

(57) ABSTRACT

A contactor for a heat and/or material exchange column includes an arrangement of two structured packings developing different geometric surface areas and having parallel principal directions.
A heat exchange column, a floating structure including such a contactor, and the use of a column equipped with such a contactor are also disclosed.

18 Claims, 5 Drawing Sheets

(56) References Cited

U.S. PATENT DOCUMENTS

2010/0213625 A1  8/2010  Raynal et al.

* cited by examiner

EXCHANGE COLUMN CONTACTOR CONSISTING OF AN ARRANGEMENT OF STRUCTURED PACKINGS

FIELD OF THE INVENTION

The present invention relates to the sphere of offshore gas/liquid contact columns, and more particularly to offshore gas treatment, $CO_2$ capture, dehydration or distillation units.

BACKGROUND OF THE INVENTION

Offshore gas treatment and/or $CO_2$ capture units using amine wash processes comprise liquid or gaseous fluid absorption and regeneration columns. These columns operate under counter-current or co-current gas/liquid flow conditions and they are installed on vessels, floating barges or offshore platforms, of FPSO (Floating Production, Storage and Offloading) type or of FLNG (Floating Liquefied Natural Gas) type for example. Floating barges also comprise distillation columns or dehydration columns.

The columns used in these offshore gas treatment and/or $CO_2$ capture and/or distillation and/or dehydration units are generally based on the principle of a material and/or heat exchange between the gas and the fluid that circulate in the columns. Contacting columns generally consist of a cylindrical enclosure provided with internal contacting elements promoting exchange between the fluids. The contacting elements (contactor) that increase the contact surface area can be structured packings, random packings or trays. FIG. 1 shows a particular case of a gas treatment column 1 equipped with a distributor tray at the column top. In this example, the gas (G) and the liquid (L) circulate in a counter-current flow. Conventionally, this gas treatment column 1 comprises several sections 3 filled by a contactor, and a distributor tray 2 is arranged above each contactor 3. The gas/liquid contactor contacts gas G with liquid L so as to allow exchanges.

The gas/liquid contact columns considered are placed on floating structures, of vessel, platform or barge type for example, sensitive to the wave motion. The equipments installed on these units, notably the gas/liquid distributor trays, therefore undergo wave motions up to six degrees of freedom (yaw, pitch, roll, heave, sway, thrust).

By way of indicative information, the angle associated with the combination of the pitch and roll oscillations is of the order of +/−5° with a period ranging from 10 to 20 s. The orders of magnitude of the longitudinal, transverse and vertical accelerations encountered in the column respectively range between 0.2/0.8/0.2 m/s$^2$ 6 m above the deck where the column is arranged and 0.3/1.3/0.3 ms$^2$ 50 m above the deck. Under such conditions, the operation of conventional contact columns can be greatly disturbed. Indeed, the effect of the wave motion can degrade the homogeneity of the phase distribution in the column section.

If it is not controlled, this poor distribution in the packing bed can substantially degrade the performances of the contact column. In order to avoid this type of problem, various suitable structured packing piles have been developed.

For example, patent application U.S. Pat. No. 5,486,318 discloses contactor embodiments with partitioning of the packing section. In a first embodiment, the packing section is partitioned by perforated walls. The column is thus made up of several compartments equipped with structured packings. In a second embodiment, each packing section is perpendicularly adjacent to the other section, thus the total section of the column is made up of a multiplicity of structured packing sections. However, for the embodiments described in this patent, the partitioning mode used can degrade the homogeneity of the flow in the column. Indeed, when a fraction of the liquid, under the effect of the sea motion, moves radially from one section to another, the liquid accumulates on the obstruction plane, which is, depending on the embodiment, a perforated wall or a packing plate. The accumulation of liquid coming from several packing sheets tends to form a preferred path for the liquid and the gas, thus degrading the transfer performances of the contact column.

Furthermore, patent application U.S. Pat. No. 5,984,282 discloses an embodiment of a contactor arrangement where the structured packing is arranged in a specific way so as to allow uniform distribution. However, this implementation is complex.

Besides, patent applications U.S. Pat. No. 7,559,539 and U.S. Pat. No. 7,559,540 disclose contactor embodiments where the packing bed consists of two structured packing types (geometric surface areas, angles, etc.). The packing beds having different areas can be superimposed in the axial direction of the column or in the radial direction according to the patent. In patent applications U.S. Pat. No. 7,559,539 and U.S. Pat. No. 7,559,540, the section of the column is not split into several packing sections, therefore, under the action of the three-dimensional wave motion, the embodiments do not allow to prevent lateral displacement of the liquid in all directions. These embodiments do therefore not provide good distribution of the liquid and vapour phases in an offshore environment.

In order to overcome these drawbacks, the invention relates to a contactor for a heat and/or material exchange column comprising an arrangement of two structured packings developing different geometric surface areas and having parallel principal directions. The present invention thus allows to ensure good homogeneity and uniformity of the distribution in the structured packing bed, therefore providing smooth operation of the column, notably in case of inclination thereof, whatever the direction of inclination of the column.

SUMMARY OF THE INVENTION

The invention relates to a contactor for a column intended for heat and/or material exchange between two fluids, said contactor comprising at least one packing layer consisting of an arrangement of at least a first structured packing and a second structured packing developing a specific geometric surface area greater than said first structured packing. The principal direction of said first structured packing is parallel to the principal direction of said second structured packing.

According to the invention, said first and second structured packing are arranged as structured packing blocks, each block of said first structured packing being surrounded by blocks of said second structured packing.

Advantageously, said blocks are substantially parallelepipedic, cylindrical, prismatic and/or they have the shape of cylinder portions.

Preferably, the volume of each block of said second structured packing is smaller than the volume of each block of said first structured packing.

According to one embodiment of the invention, said blocks being substantially parallelepipedic, said blocks of said second structured packing form, in a horizontal plane, substantially perpendicular bands.

Alternatively, said blocks being substantially cylindrical, said blocks of said second structured packing form, in a horizontal plane, substantially concentric circles.

Advantageously, the periphery of said contactor consists of said second structured packing.

According to one aspect of the invention, the specific geometric surface area of said first structured packing ranges between 100 and 375 m²/m³, and it is preferably substantially equal to 250 m²/m³.

Furthermore, the specific geometric surface area of said second structured packing ranges between 250 and 750 m²/m³, and it is preferably substantially equal to 500 m²/m³.

Preferably, said contactor comprises several packing layers for which the principal directions are substantially perpendicular to one another.

Furthermore, the invention relates to a column intended for heat and/or material exchange between a gas and a liquid, wherein the two fluids are contacted by means of at least one contactor according to the invention.

The invention also relates to a floating structure, notably for hydrocarbon recovery. It comprises at least one column intended for heat and/or material exchange between a gas and a liquid according to the invention.

Moreover, the invention relates to the use of a column according to the invention for a gas treatment, $CO_2$ capture, distillation or air conversion process.

BRIEF DESCRIPTION OF THE FIGURES

Other features and advantages of the method according to the invention will be clear from reading the description hereafter of embodiments given by way of non limitative example, with reference to the accompanying figures wherein.

DETAILED DESCRIPTION

The invention relates to a contactor for a column intended for heat and/or material exchange between two fluids. A contactor is an element allowing two fluids to be contacted so as to promote heat and/or material exchanges between the two fluids. The contactor according to the invention comprises at least one packing layer consisting of at least a first structured packing and a second structured packing developing a specific geometric surface area greater than the first structured packing. According to the invention, in each packing layer, the principal direction of the first structured packing is parallel to the principal direction of the second structured packing.

Figure 9:
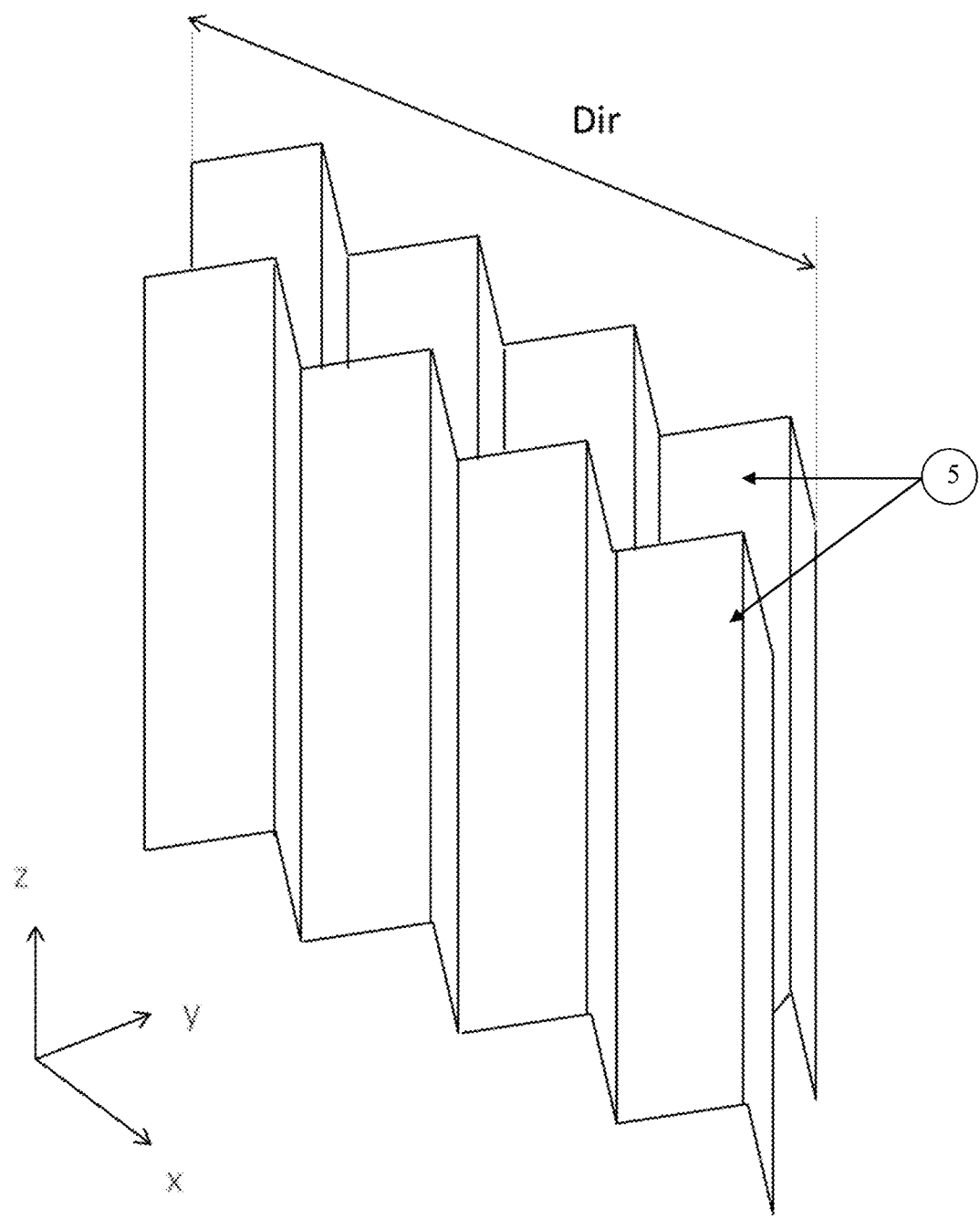
FIG. 9 illustrates two consecutive plates of a structured packing.

What is referred to as structured packing is a pile of corrugated plates or folded sheets arranged in an organized manner in form of large blocks as described notably in patent applications FR-2,913,353 (US-2010/0,213,625), U.S. Pat. No. 3,679,537 and U.S. Pat. No. 4,296,050. Structured packings afford the advantage of providing a large geometric surface area for a given representative diameter. The plates that make up the structured packing comprise, in the transverse plane, a principal direction. The principal direction thus is a direction perpendicular to the vertical axis, defined by the structure of the plates. FIG. 9 shows an example of two consecutive corrugated plates 5 of a structured packing. In this figure, axis z corresponds to the vertical axis where the fluid flow occurs and axes x and y define a horizontal (transverse) plane. Principal direction Dir of the structured packing is shown in this figure, it corresponds to the orthogonal direction to the vertical axis passing through the vertices (or hollows) of the corrugations of the plates of the structured packing. In this figure, the principal direction of the structured packing is parallel to axis x.

Figure 1:
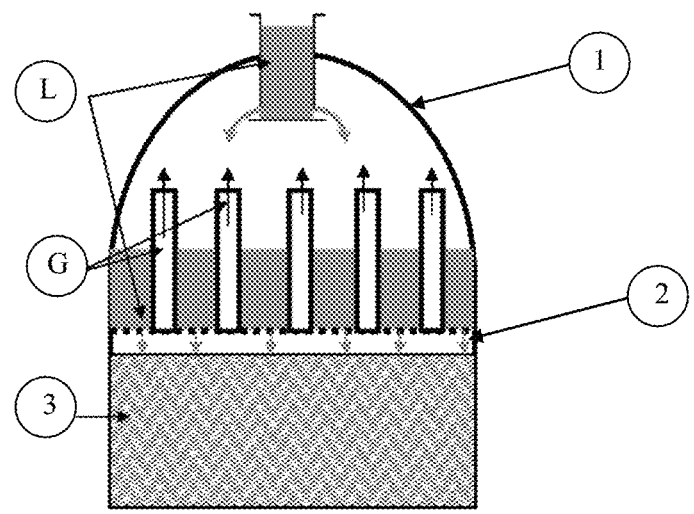
FIG. 1, already described, illustrates the particular case of a gas treatment or $CO_2$ capture column equipped with a distributor tray at the column top.
Figure 2:
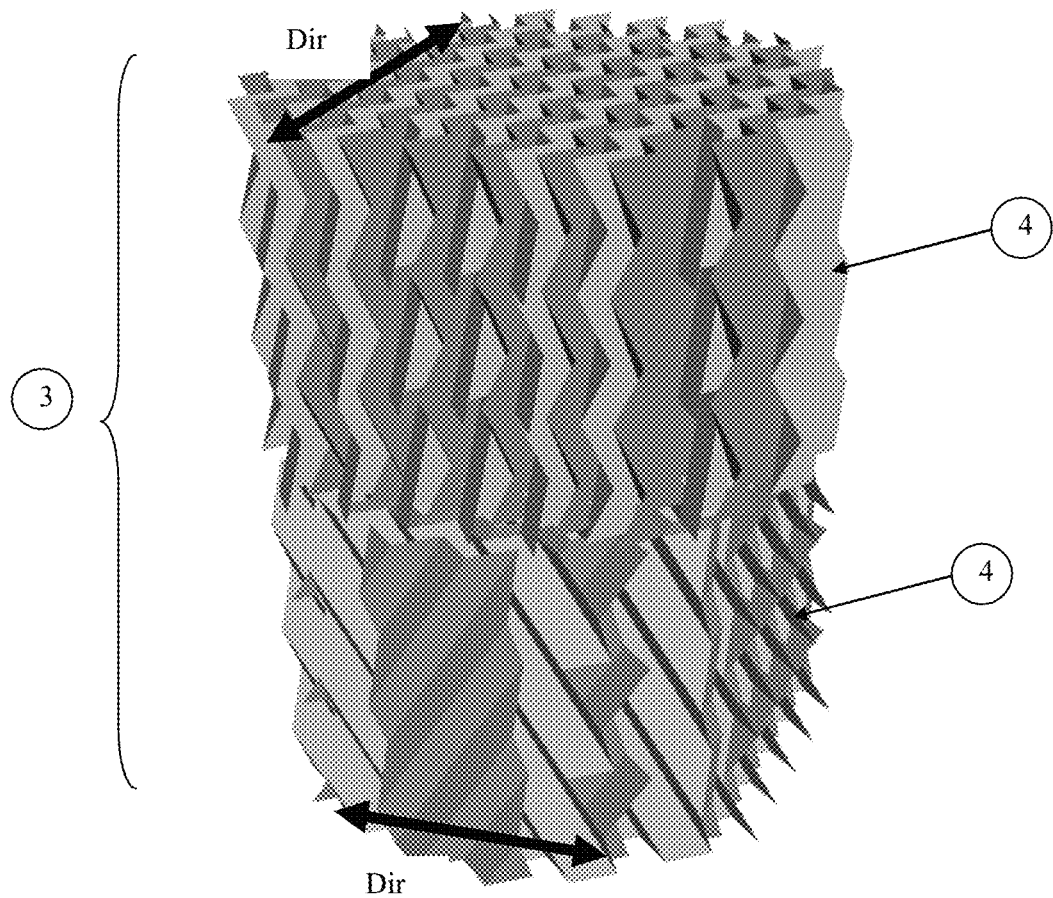
FIG. 2 illustrates a contactor consisting of two structured packing layers.

Conventionally, the contactor comprises several structured packing layers piled one above the other. FIG. 2 illustrates a contactor 3 consisting of two structured packing layers 4. In order to promote exchanges between the fluids, the layers of the contactor have different principal directions, they are preferably substantially perpendicular to one another. The height of the layers can range between 0.1 and 0.3 m, and it is preferably equal to 0.21 m.

The specific geometric surface area of a structured packing corresponds to the total area developed by the packing, this surface area being expressed as the geometric surface area of the packing per volume unit. Conventionally, structured packings can develop specific geometric surface areas ranging between 100 and 750 m²/m³. As a result of their geometric layout, structured packings develop specific surface areas that are larger than those of random packings, with the same hydraulic capacity.

According to the invention, the principal directions of the structured packing sections having different geometric surface areas are parallel to one another. The structured packings can have identical structures with different dimensions or they can have different structures. Splitting the packing section into several beds with different specific geometric surface areas allows to prevent massive displacement of the liquid laterally or the formation of preferred paths in the packing, under the effect of the wave motion. Indeed, the packing section with a greater geometric surface area allows to attenuate/slow down the inertia and the lateral displacement of the liquid and vapour phases, thus providing good phase distribution homogeneity in the structured packing. Moreover, the boundary between the various packing sections is not obstructed. Thus, the present invention allows to provide homogeneous and uniform distribution of the liquid and gas phases by means of the arrangement of two packing sections with a specific geometric surface area gradient.

Advantageously, the first and the second structured packings are so arranged as to form structured packing blocks. Each structured packing block consists of a structured packing type (either the first structured packing or the second structured packing). By way of non limitative example, the blocks are parallelepipedic, cylindrical, prismatic, or they have the shape of a cylinder portion. Advantageously, each block consisting of the first structured packing is surrounded by blocks consisting of the second structured packing. When a block consisting of the first structured packing is arranged on the periphery of the contactor, it is surrounded by blocks consisting of the second structured packing and by the column (column shell). The layout of the contactor in form of blocks allows to attenuate/slow down the inertia and the displacement of the fluids in all directions. In order to optimize the distribution homogeneity, the blocks consisting of the second structured packing have a smaller volume than the blocks consisting of the first structured packing. The volume of the blocks consisting of the second structured packing is generally smaller than the volume of the blocks consisting of the first structured packing, and it is preferably less than half this volume.

According to one embodiment of the invention, the specific geometric surface area of said first structured packing ranges between 100 and 375 $m^2/m^3$, and it is preferably substantially equal to 250 $m^2/m^3$. Furthermore, the specific geometric surface area of said second structured packing ranges between 250 and 750 $m^2/m^3$, and it is preferably substantially equal to 500 $m^2/m^3$.

The invention is comprised of an arrangement of at least two structured packing types with different geometric surface areas. The basic principle of the invention is to divide the packing bed in the axial direction of the column into several sections with packings having a greater specific geometric surface area. FIGS. 3 to 8 show different embodiments of the invention. These figures correspond to views in the horizontal plane of the structured packing arrangement. In these figures, the first structured packing is denoted by A and the second structured packing developing a greater geometric surface area is denoted by B.

Figure 3:
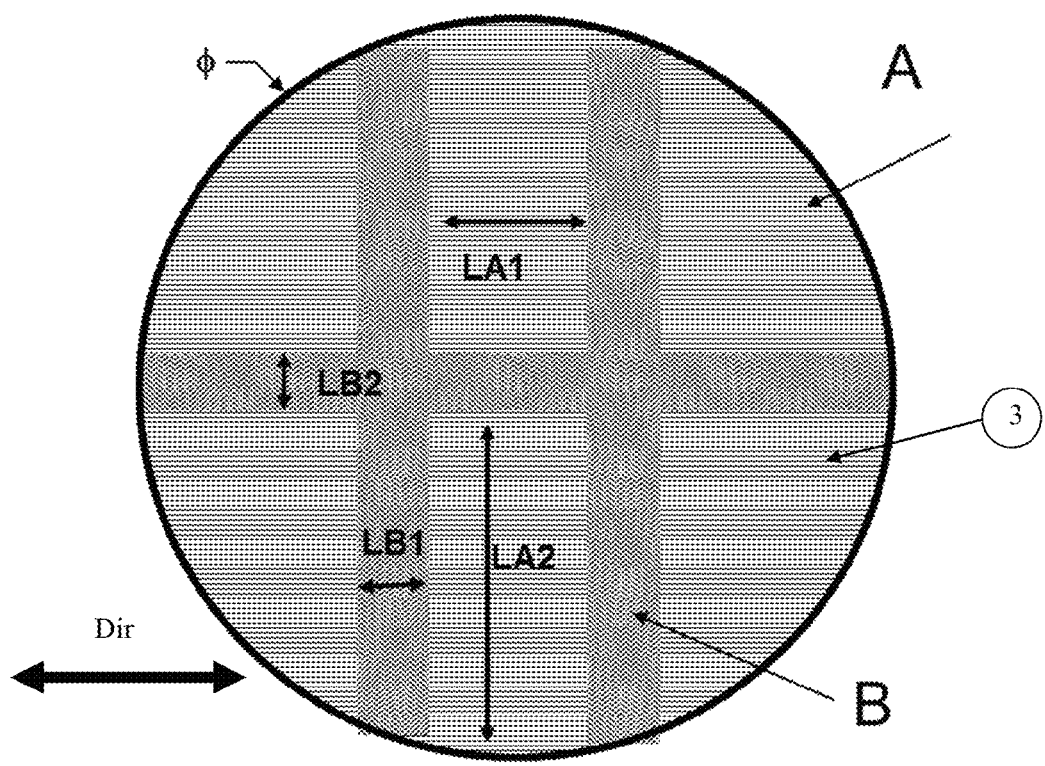
FIGS. 3 to 8 illustrate different embodiments of the arrangement of the structured packings of a contactor according to the invention.
Figure 4:
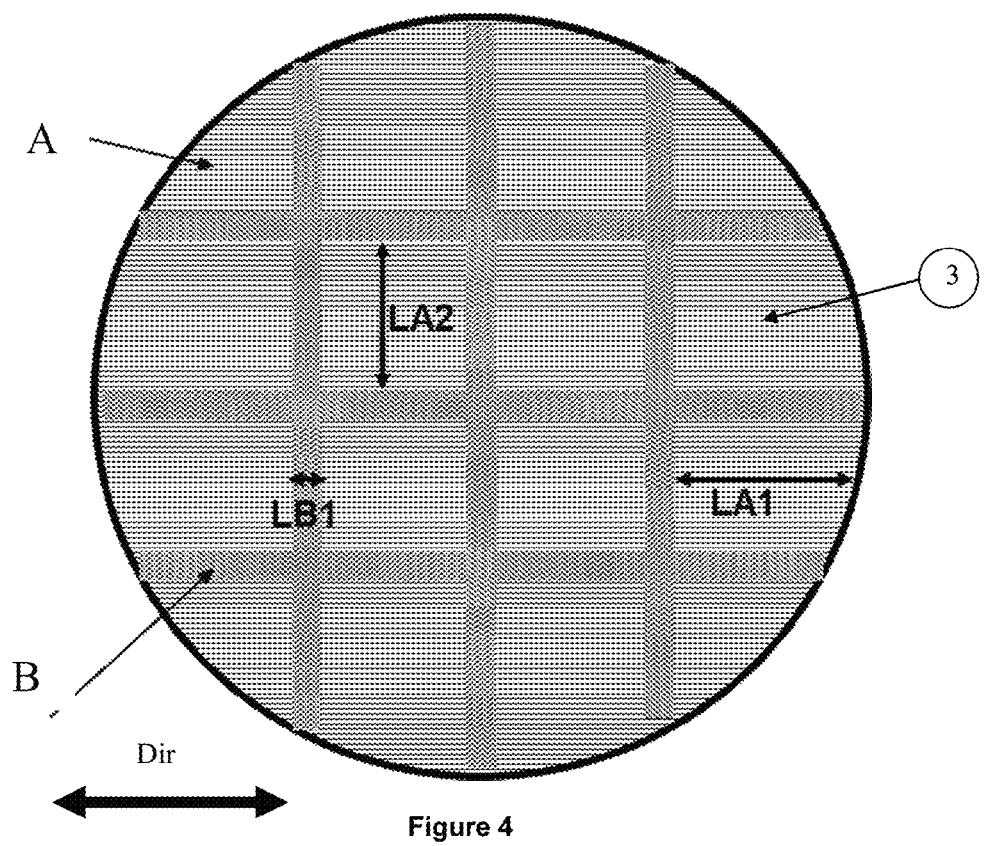

For the embodiments of FIGS. 3 and 4, the blocks are substantially parallelepipedic. Furthermore, the blocks consisting of second packing B substantially have the shape of bands (blocks whose width is much smaller than the length thereof). As illustrated, the bands are arranged along two directions in the horizontal plane. These two directions are substantially perpendicular to one another. For these embodiments, each block of packing A is surrounded by the bands of packing B and optionally by the contour of column φ. The example of FIG. 4 comprises more blocks than the example of FIG. 3, therefore this embodiment is more suited for large-diameter columns or columns subjected to greater inclinations. According to one aspect of these embodiments, the diameter of column φ ranges between 0.5 and 10 m, the dimensions of the blocks of packing A: LA1 and LA2, range between 0.2 and 5 m, and the dimensions of the bands of packing B: LB1 and LB2, range between 0.1 and 2.5 m. For example, for the embodiment of FIG. 4, the dimensions can be selected as follows: the diameter of column is 4 m, the dimensions of the blocks of packing A: LA1 and LA2, are 0.75 m, and the dimensions of the bands of packing B: LB1 and LB2, are 0.2 m, with a specific geometric surface area for packing A of 250 $m^2/m^3$ and a specific geometric surface area for packing B of 500 $m^2/m^3$.

Figure 5:
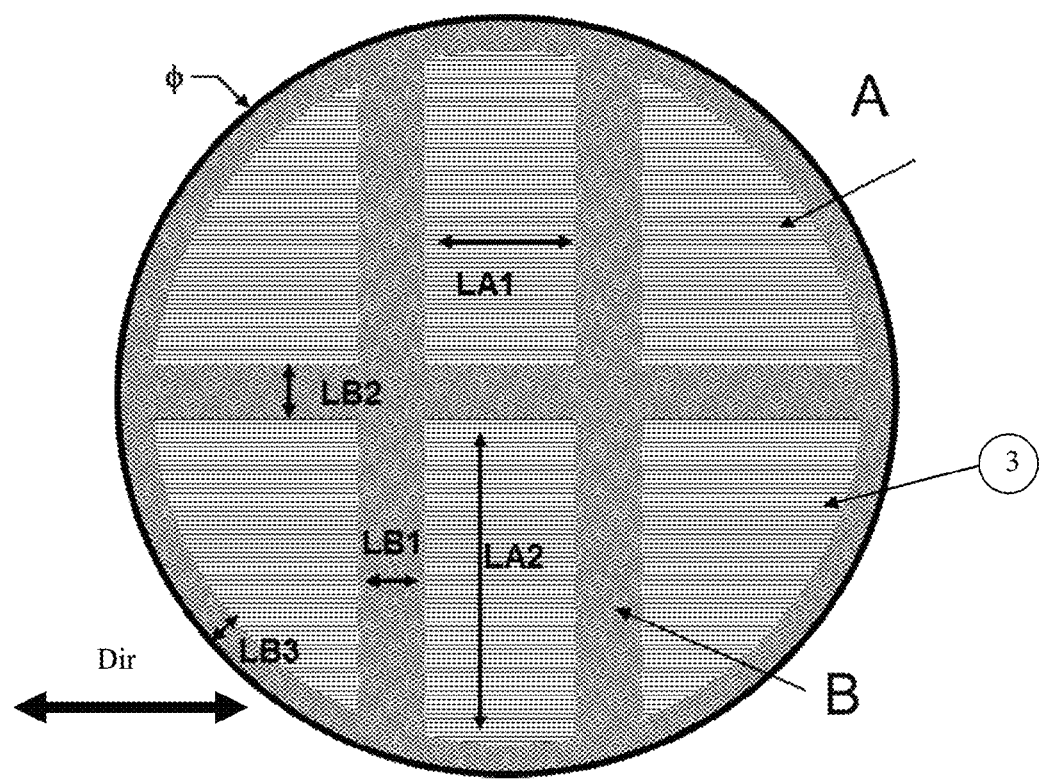
Figure 6:
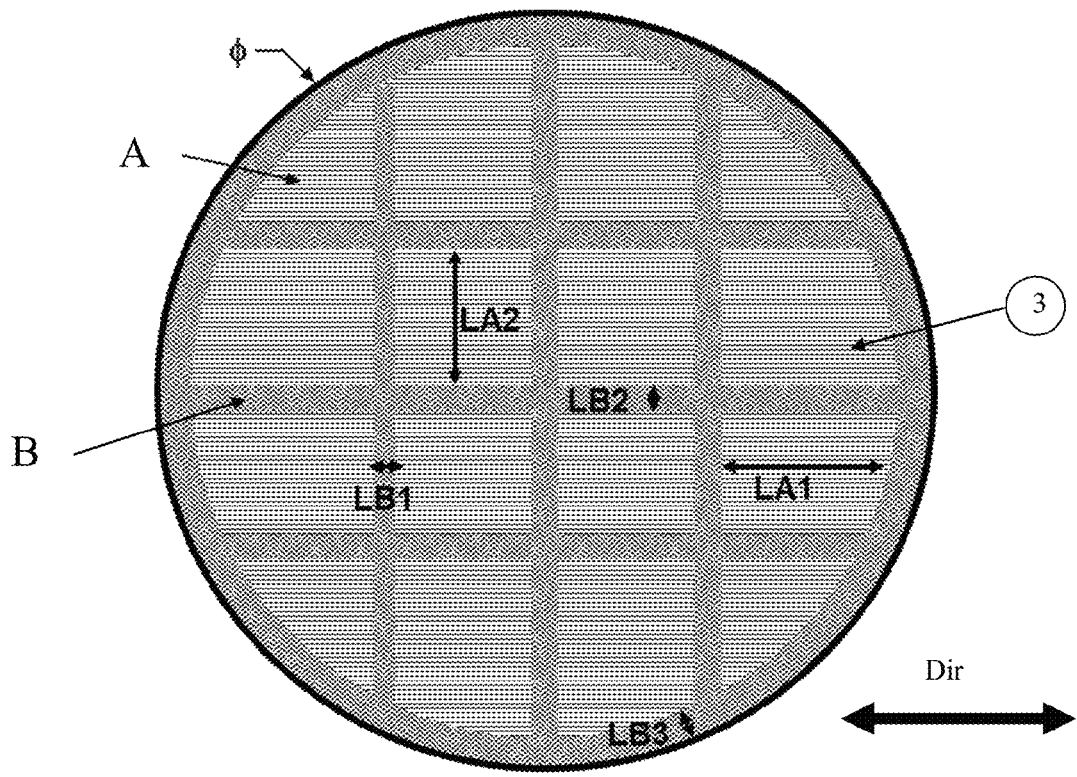

The embodiments of FIGS. 5 and 6 correspond to the embodiments of FIGS. 3 and 4 where the periphery of the contactor is made up of structured packing B. Arranging a block of the second structured packing on the periphery notably allows to prevent liquid accumulation on the wall of the column. The blocks consisting of second packing B substantially have the shape of bands. As illustrated, the bands are arranged along two directions in the horizontal plane. These two directions are substantially perpendicular to one another. For these embodiments, each block of packing A is surrounded only by blocks of packing B. The example of FIG. 6 comprises more blocks than the example of FIG. 5, therefore this embodiment is more suited for large-diameter columns or for columns subjected to greater inclinations. For example, the diameter of column φ ranges between 0.5 and 10 m, the dimensions of the blocks of packing A: LA1 and LA2, range between 0.2 and 5 m, the dimensions of the bands of packing B: LB1 and LB2, range between 0.1 and 2.5 m, and the dimension of the peripheral block LB3 ranges between 0.1 and 2.5 m.

Figure 7:
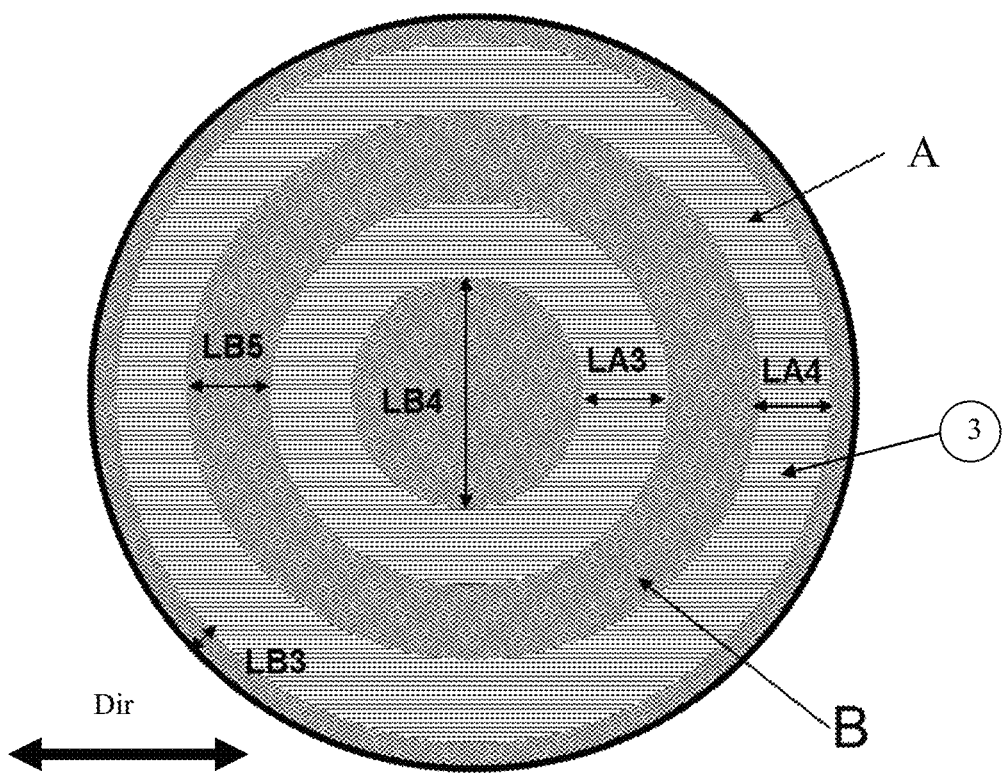

For the embodiment of FIG. 7, the blocks are substantially cylindrical (tubular) in the horizontal plane: the arrangement of the structured packings forms a set of concentric circles where packings A alternate with packings B. For this embodiment, the central block of the contactor is a block of packing B and the contactor comprises a peripheral block consisting of packing B. Each block of packing A is thus surrounded by blocks of packing B. For example, the diameter of column φ ranges between 0.5 and 10 m, the dimensions of the blocks of packing A: LA3 and LA4, range between 0.2 and 2.5 m, the dimensions of the blocks of packing B: LB4, range between 0.2 and 1 m, LB5 and LB6 range between 0.1 and 2.5 m, and the dimension of peripheral block LB3 ranges between 0.1 and 2.5 m.

Figure 8:
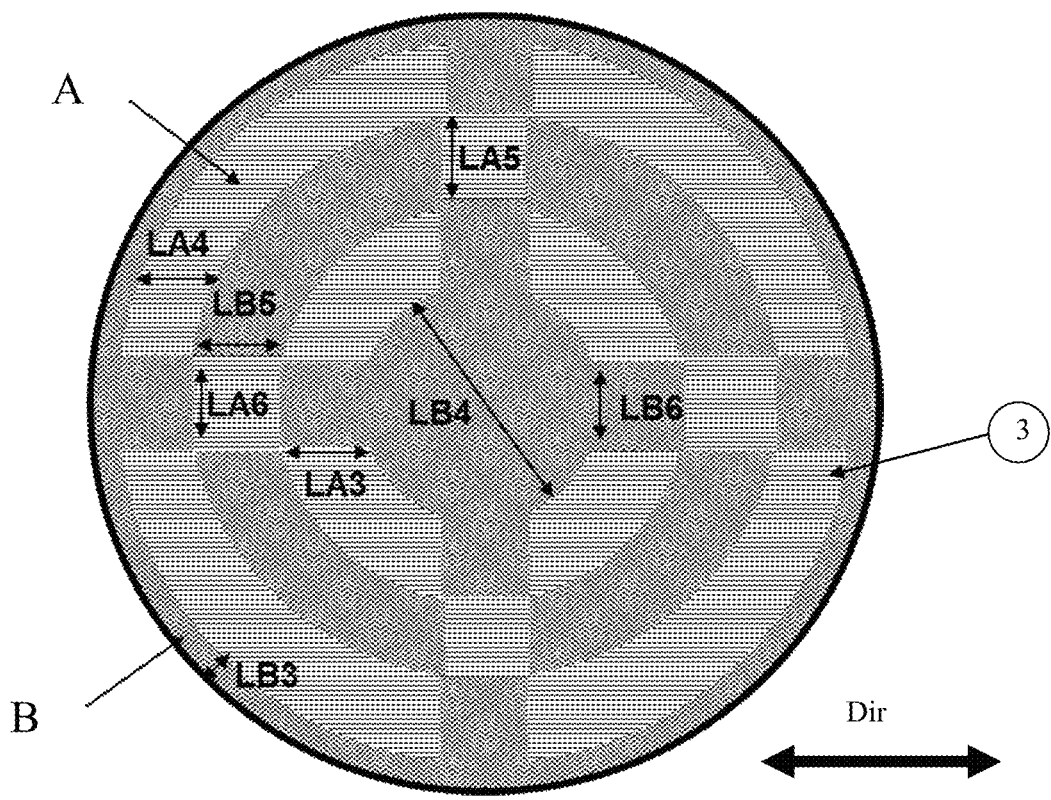

For the embodiment of FIG. 8, the majority of the blocks are substantially cylindrical (tubular) or they have the shape of a cylinder (or tube) portion, and a minority of the blocks are substantially rectangular in the horizontal plane. The arrangement of the structured packings forms a set of concentric portions of circles (substantially quarter circles for example) where packings A alternate with packings B. Furthermore, the arrangement comprises some rectangles. This arrangement forms an alternation of packings A and B. For this embodiment, the central block is a block of packing B and the contactor comprises a peripheral block consisting of packing B. Each block of packing A is thus surrounded by blocks of packing B. The example of FIG. 8 comprises more blocks than the example of FIG. 7, therefore this embodiment is more suited for large-diameter columns or columns subjected to greater inclinations. For example, the diameter of column φ ranges between 0.5 and 10 m, the dimensions of the blocks of packing A: LA3, LA4, LA6, range between 0.2 and 2.5 m, the dimensions of the blocks of packing B, LB4, range between 0.2 and 1 m, LB5 and LB6 range between 0.1 and 2.5 m, and the dimension of peripheral block LB3 ranges between 0.1 and 2.5 m.

These embodiments allow to provide a simple arrangement, which notably enables to simplify the setting, in practice, of the packing elements in the contact column.

Furthermore, other embodiments can be considered, for example by defining substantially triangular blocks by means of bands of packing B oriented at 45° with respect to one another, or using the arrangement of FIGS. 7 and 8 while removing the peripheral layer of the second packing.

According to another variant embodiment of the invention, the layers of the contactor consist of more than two different structured packings whose principal directions are parallel to one another. For example, the structured packing with the greatest specific geometric surface area is so arranged as to slow down/limit the fluid displacement in the principal direction of inclination of the column, and the packing with an intermediate specific geometric surface area is arranged in a direction perpendicular to the structured packing having the greatest specific geometric surface area.

The invention also relates to a column 1 intended for material and/or heat exchange between two fluids, wherein two fluids are contacted by means of at least one gas/liquid contactor 3, column 1 comprising at least a first inlet for a liquid fluid, at least a second inlet for a gaseous fluid, at least a first outlet for a gaseous fluid and at least a second outlet for a liquid fluid. According to the invention, the contactor is as described above. Furthermore, column 1 can comprise at least one distributor tray 2 allowing distribution of the fluids onto contactor 3.

The gas and the liquid can circulate in the column in a counter-current or co-current flow.

Furthermore, the invention relates to a floating structure such as a platform, a vessel, a barge for example of FPSO or FLNG type, notably for hydrocarbon recovery. The floating structure comprises at least one hydrocarbon treating unit including at least one material and/or heat exchange column according to the invention.

The column according to the invention can be used in gas treatment, $CO_2$ capture (amine wash for example), distillation or air conversion processes.

Furthermore, the invention can be used with any solvent type.

The invention claimed is:

1. A contactor for a column intended for heat and/or material exchange between two fluids, comprising at least one packing layer comprising an arrangement of at least a first structured packing and a second structured packing, the second structured packing developing a specific geometric surface area, expressed as a geometric surface area of the packing per volume unit, greater than the specific geometric surface area of the first structured packing, the first structured packing has a principal direction through and along hollows between corrugations of plates of the first structured packing corresponding to an orthogonal direction to a vertical axis, the second structured packing has a principal direction passing through and along hollows between corrugations of plates of the second structured packing corresponding to an orthogonal direction to a vertical axis, and the principal direction of the first structure packing is parallel to the principal direction of the second structured packing.

2. A contactor as claimed in claim 1, wherein said first structured packing is divided into a plurality of first structured packing portions, and wherein each of the plurality of first structured packing portions is surrounded by a portion of the second structured packing.

3. A contactor as claimed in claim 2, wherein each of the plurality of first structured packing portions is substantially parallelepipedic, cylindrical, prismatic and/or has the shape of cylinder portions.

4. A contactor as claimed in claim 2, wherein a volume of each portion of the second structured packing surrounding a portion of each of the plurality of first structured packing portions is smaller than a volume of the portion of each of the plurality of first structured packing portions it surrounds.

5. A contactor as claimed in claim 2 wherein the portions of the second structured packing surrounding the portions of the first structured packing have a substantially parallelepipedic shape, and form, in a horizontal plane, substantially perpendicular bands.

6. A contactor as claimed in claim 2 wherein the portions of the second structured packing surrounding the portions of the first structured packing have a substantially cylindrical shape, and form, in a horizontal plane, substantially concentric circles.

7. A contactor as claimed in claim 1, wherein the second structured packing is provided at a periphery of the contactor.

8. A contactor as claimed in claim 1, wherein the specific geometric surface area of the first structured packing ranges between 100 and 375 $m^2/m^3$.

9. A contactor as claimed in claim 1, wherein the specific geometric surface area of the second structured packing ranges between 250 and 750 $m^2/m^3$.

10. A contactor as claimed in claim 1, wherein the contactor comprises several packing layers for which the principal directions are substantially perpendicular to one another.

11. A column intended for heat and/or material exchange between a gas and a liquid, comprising at least one contactor as claimed in claim 1.

12. A floating structure comprising at least one column intended for heat and/or material exchange between a gas and a liquid as claimed in claim 11.

13. A process of using the column as claimed in claim 11 for a gas treatment, $CO_2$ capture, distillation or air conversion process by conducting heat and/or material exchange between a gas and a liquid in the at least one contactor of the column.

14. A contactor as claimed in claim 8, wherein the specific geometric surface area of the second structured packing ranges between 250 and 750 $m^2/m^3$.

15. A contactor as claimed in claim 1, wherein the specific geometric surface area of the first structured packing is substantially equal to 250 $m^2/m^3$.

16. A contactor as claimed in claim 15, wherein the specific geometric surface area of the second structured packing is substantially equal to 500 $m^2/m^3$.

17. A contactor as claimed in claim 1, wherein the specific geometric surface area of the second structured packing is substantially equal to 500 $m^2/m^3$.

18. A contactor as claimed in claim 8, wherein the specific geometric surface area of the second structured packing is substantially equal to 500 $m^2/m^3$.

* * * * *